May 2, 1967  UNOKICHI TAKAI  3,317,644
METHOD FOR PRODUCING A PLASTIC FABRIC
HAVING PILE-LIKE PROJECTIONS
Filed June 24, 1963  3 Sheets-Sheet 1
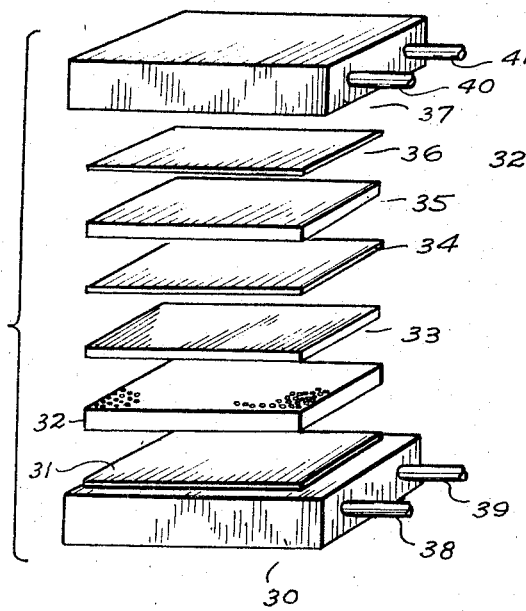
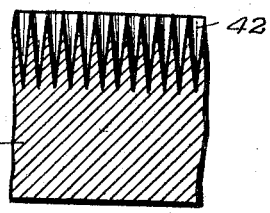
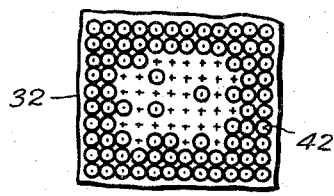
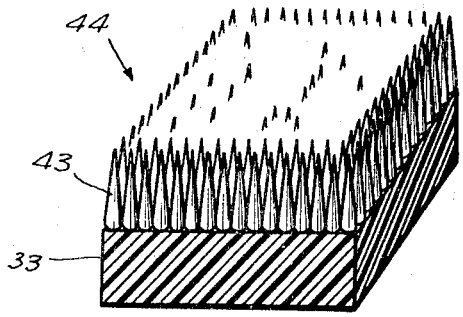
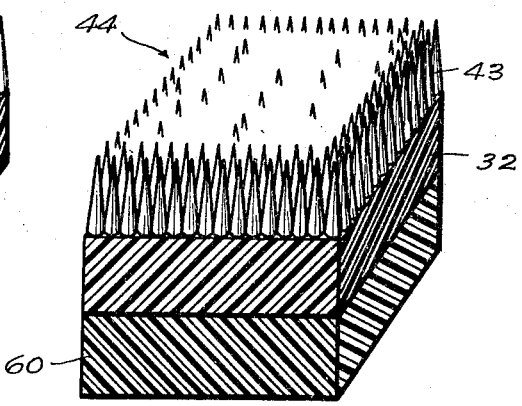
INVENTOR.
UNOKICHI TAKAI,
BY
AGENT.

United States Patent Office 3,317,644
Patented May 2, 1967

3,317,644
METHOD FOR PRODUCING A PLASTIC FABRIC HAVING PILE-LIKE PROJECTIONS
Unokichi Takai, 4 315–18 Kofuchu-machi, Kofu, Japan
Filed June 24, 1963, Ser. No. 289,860
13 Claims. (Cl. 264—246)

This invention relates to an improvement in a method for producing a plastic fabric having integral pile like projections. The invention is especially directed toward the production of pile like projections on at least one face of a fabric formed from a sheet of thermoplastic material.

An object of this invention is to provide a method for producing from a thermoplastic a fabric having pile like projections on at least one face and wherein said fabric may exhibit variations in color or composition at different points therein.

A further object of this invention is the production of a pile like thermoplastic fabric wherein the fabric may exhibit different colors or compositions in different planes parallel to a surface of the general plane of the fabric.

An additional object of this invention is the production of a pile like fabric from a thermoplastic sheet wherein said fabric may exhibit different colors or compositions at different predetermined areas thereof.

A still further object of this invention is the production of a pile like fabric from a thermoplastic sheet wherein the pile like projections are integral and exhibit color changes along their lengths.

Yet another object of this invention is the production of a pile like fabric from a sheet of thermoplastic material wherein areas of the pile like surface are of different colors.

Another object of this invention is the production of a pile like fabric from a sheet of thermoplastic material wherein certain surface areas are provided with integral non-piliform ornamentation.

A further object of this invention is the production of a pile like fabric from thermoplastic material in sheet form wherein certain areas have different colors or compositions, said areas being delineated by inlaying in the base sheet portions having different colors or compositions.

A different object of the invention is the provision of a pile like fabric from thermoplastic material in sheet form wherein discrete portions of selected thermoplastic material are superposed on a base sheet, prior to formation of the pile like projections.

Still another object of this invention is the production of a pile like fabric of thermoplastic material in sheet form wherein different colors or compositions are imparted to the pile like projections in planes parallel to the general plane of the fabric by superposing one or more sheets of thermoplastic material having different characteristics on the surface of the base sheet on which the pile like projections are formed.

A general object of this invention is the provision of a matrix having formed in a surface thereof a multiplicity of relatively small inwardly tapered depressions of suitable depth, and forcing a portion of a thermoplastic sheet into said depressions by the application of heat and pressure, removing the heat and applying cooling at a high pressure to solidify the thus formed pile like projections in the depressions.

The above and other objects will become apparent from a consideration of the following specification taken with the accompanying drawings, which taken together form a complete disclosure of my invention.

In the drawings:

FIG. 1 is an exploded axonometric view of the basic assembly used in the formation of the fabric of this invention;

FIG. 2 is a fragmentary vertical section through the matrix;

FIG. 3 is a plane fragmentary view of the matrix;

FIG. 4 is an axonometric view of a section of the basic fabric of this invention, partly in section;

FIG. 5 is an axonometric view of a modification of FIG. 4, partly in section;

In the drawings, like parts are represented by like characters of reference, and in the present case where the numerical value of a previously used numeral is increased by 100 or a multiple thereof, a modification is indicated.

Figure 6:
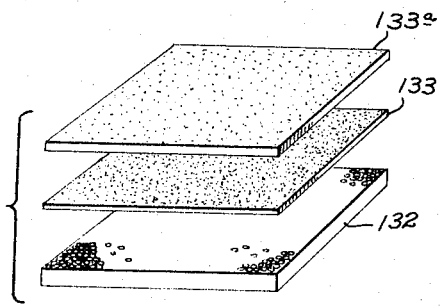
FIG. 6 is an exploded fragmentary axonometric view of a modification of the arrangement shown in FIG. 1.

The fabric of the present invention is basically like that produced by the apparatus and method of the prior U.S. Patent No. 3,027,595 issued to Takai et al. Apr. 3, 1962, and in other respects is an improvement on the method and product of the aforesaid Takai et al. patent.

Referring now to FIGS. 1 to 5, the assembly in FIG. 1 includes a heating element 30, a lower back-up plate 31, preferably iron, a matrix or die 32, a sheet 33 of thermoplastic material, later to be described, a plate 34 of canvas or other suitable fabric material capable of withstanding the heat employed in the operation, a sheet 35 of rubber or other suitable elastomeric material having a shore hardness of about 50°, an iron plate 36 and a top heater element 37. The heater 30 is provided with inlet pipe 38 and outlet pipe 39. The heater 37 is provided with inlet pipe 40 and outlet pipe 41 for steam or other suitable heating fluid. The matrix or die 32 is provided with a multiplicity of very closely spaced conical depressions 42 throughout its upper surface.

In operating the invention as thus far described, the parts are assembled as shown in FIG. 1 and the upper and lower heaters are brought to a temperature of about 170° C. by passing superheated steam or hot oil therethrough. The iron plates 31 and 36 may be about 1 mm. in thickness.

The assembly is placed in a suitable hydraulic press and put under a pressure of 100–120 pg./cm.² for about 10–15 minutes. The pressure range above noted is such that if the depressions 42 were 1 mm. deep the lower pressure would be used for about 10 minutes. For 10 mm. depth the higher pressure would be used for about 15 minutes. The pressures and times for other depths would vary accordingly. After the necessary elapsed time, during which the surface of the thermoplastic sheet softens and flows into the depressions, the pile like projections 43 are formed. In order to remove the thus formed pile like fabric 44, without tearing the piliform projections, heating is terminated. Cooling fluid at a temperature of about 5° C. will be circulated in the heaters 30 and 37. At the same time the pressure is increased in the range of from 5 to 20%. The piliform projections 43 which have been forced into the depressions 42 become solidified. After about 10 to 15 minutes of such treatment the assembly may be disassembled and the finished fabric 44 may be removed.

The fabrics of this invention have many uses both utilitarian and decorative. For wall coverings or ceilings, one might desire the ornamented fabrics of this invention. They may also be used for certain forms of draperies. For use on floors they may be made both utilitarian and ornamental. A fabric such as has just been described when used where rigidity is desired may be made according to FIG. 5, wherein the fabric 44 is provided with a backing 60, which may have a desired degree of thickness, flexibility or rigidity.

The thermoplastic material of which the fabrics of this invention are formed is made of a base of polyvinyl chloride substantially according to the following table.

| | Kg. |
|---|---|
| Polyvinyl chloride | 100 |
| Plasticizer | 80 |
| Stabilizer | 3 |
| Pigment | 2 |
| Antistatic agent (anion active agent) | 0.5 |

The above ingredients are thoroughly mixed on a hot mixing roll and are rolled and calendered into sheets of 1 to 4 mm. thickness, and wound for storage. The thickness of the sheet is determined by the length of the piliform projections to be produced thereon. There should be enough material at the bases of the projections to render the sheet immune to damage from ordinary handling. Examples of preferred thicknesses are 1 mm. where the projections are to be 1 to 3 mm. long, and 2 mm. when the projections are to be 4–5 mm. long, and 3 to 4 mm. when the projections are to be 6 to 10 mm. long.

The material for the die or matrix is preferably a soft metal, such as an alloy of 75% lead, 20% antimony and 5% tin. The alloy is cast in sizes suitable for the hydraulic press with which it is to be used. For example, a sheet 1.7 m. by 1.5 m. may be cast from such an alloy and will be about 30 mm. thick. One surface will be finished plane, and steel needles are driven into such surface to make the depressions 42. These will vary in number according to depth. There may be 4000 depressions per cm.$^2$ for a depth of 1 mm., 150 per cm.$^2$ for a depth of 5 mm. and 100 per cm.$^2$ for a depth of 10 mm. For floor coverings, the depth of the depressions should be more than 3 mm., and for walls, ceilings and other decorative purposes, the depressions should have a depth of at least 1 mm.

It has been explained above that the cooling fluid may be circulated through the heater members 30 and 37. However, due to the time required to cool these members to about 5° C. it is preferred to have a second press with a pair of identical heater-cooler plates 30 and 37 in which only cooling fluid is circulated. After the molding cycle is completed the pack, including the plate 31, the matrix 32, the sheet 33, the back-up fabric sheet 34, the rubber sheet 35 and the plate 36, is transferred to the cooling press and placed under the pressure mentioned above.

After a suitable time, as noted, above, the cooling plates are separated and the pack is disassembled. The sheet 32 with the piliform projections 43 is stripped from the matrix and a new cycle is started.

The proportions of suitable mixes for two variations of the backing sheet 60 are given in the following table:

| Ingredient | Hard Sheet | Soft Sheet |
|---|---|---|
| Polyvinyl Chloride, kg. | 100 | 100 |
| Calcium carbonate powdered, kg. | 300 | 100 |
| Plasticizer, kg. | 20 | 35 |
| Stabilizer, kg. | 2 | 2 |
| Titanium dioxide, kg. | 8 | 5 |

The ingredients are mixed on a hot mixing roll and rolled into sheet form by a calender roll. In the case of a soft back, the sheet may be stored in the form of a wound roll. In the case of a heavier back, the sheets may be cut to the size desired in the finished product.

Figure 7:
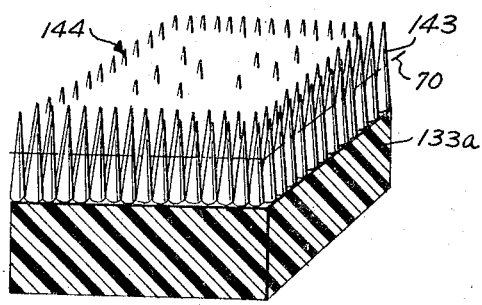
FIG. 7 is a fragmentary axonometric view of the product as formed by the arrangement in FIG. 6.

To produce a fabric in which the pile like surface possesses irridescent characteristics, I modify the operation as shown in FIG. 6. Here the matrix 132 is the same as the matrix 32 in FIG. 1. Instead of using a sheet like the sheet 33 in FIG. 1, I use here a thin sheet 133 of suitable plastic and a thicker sheet 133a of plastic such as the sheet 33 in FIG. 1. The thickness of the sheet 133 is preferably such that all of it will, in the operation of the method, flow into the depressions 42, and that a portion of sheet 133a will also flow into the depressions. To produce the effect of irridesence it is preferred that sheets 133 and 133a will be of different colors. For example, if the piliform projections are to be about 2 mm. long, the sheet 133 will be about 0.04 mm. in thickness, and the projections will have different colors for about half their length. This is illustrated by the dot-dash line 70 in FIG. 7. As another example, if the projections 143 are to be about 5 mm. in length, the sheet 133 may be 0.1 mm. in thickness, and will produce a color variation extending down about 2 mm. on the projections 143. The base sheet 133a will extend part way up the projections 143 in forming the fabric 144.

Figure 8:
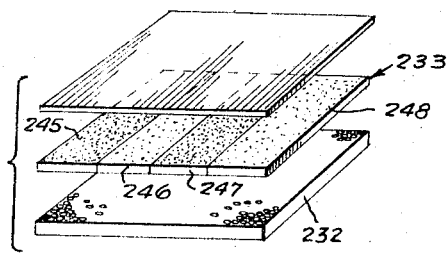
FIG. 8 is a fragmentary exploded axonometric view of the invention as illustrated in FIG. 1.
Figure 9:
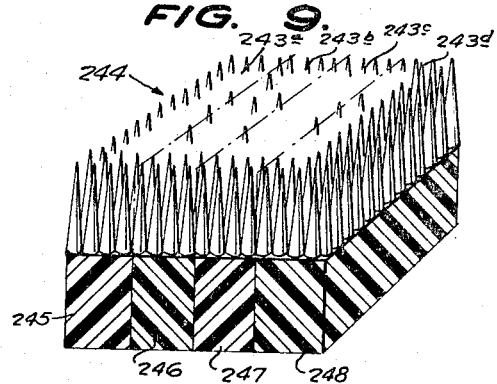
FIG. 9 is a fragmentary axonometric view of the product of the device arranged as in FIG. 8.

FIG. 8 shows a further modification of the invention wherein a pile like fabric is formed having more than one color appearing in predetermined order on its surface. In this modification, instead of a plastic sheet 33 as in FIG. 1, I form a sheet 233 of plastic ribbons 245, 246, 247 and 248. These ribbons may alternate different colors, or each may be a different color from any other. Over the ribbons I place a sheet 234 of canvas, like the canvas 34 in FIG. 1. I then complete the assembly as in FIG. 1, and place in a press to continue the process as described in connection with the method of FIG. 1, to produce the fabric 244. The fabric is shown in FIG. 9 wherein the piliform projections 243 are shown in parallel groups 243a, 243b, 243c and 243d, as indicated by the dot-dash lines on FIG. 9.

Figure 10:
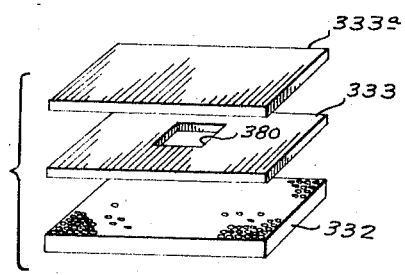
FIG. 10 is an exploded axonometric view of a further modified arrangement of the invention illustrated in FIG. 1.
Figure 11:
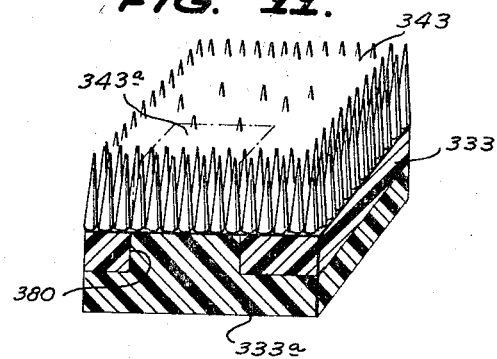
FIG. 11 is a fragmentary axonometric view of the fabric produced by the arrangement in FIG. 10.

Another modification is shown in FIGS. 10 and 11. In FIG. 10, the matrix 332 is as 32 in FIG. 1. Instead of a plastic sheet 33, I use a sheet 333 having one or more openings 380 therein. This sheet is backed up by another plastic sheet 333a. In the molding operation, a portion of the sheet 333a will be forced through the openings 380 into the depressions 42. The fabric produced will have a section as shown in FIG. 11 where a portion of the sheet 333a projects through the opening 380 and into the depressions 42 to form the piliform projections 343a. As an example of the product as shown in FIG. 11, the sheet 333 may be 0.5 mm. in thickness for piliform projections 343 and 343a of a height of about 1 mm. When it is desired to form piliform projections 343 and 343a of a height of 10 mm., the sheet 333 will have a thickness of 2 mm. In the molding operations the sheets 333 and 333a soften and bond autogenously to form a single sheet with piliform projections 343 and 343a formed integrally therewith. Here different colors of the piliform projections are indicated by the dot-dash line in FIG. 11.

Figure 12:
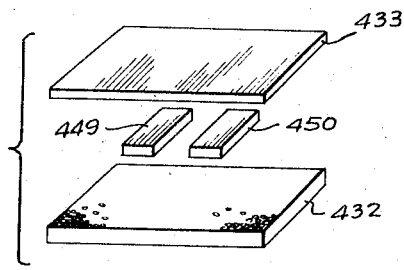
FIG. 12 is a fragmentary exploded axonometric view of a further modification of the arrangement shown in FIG. 1.
Figure 13:
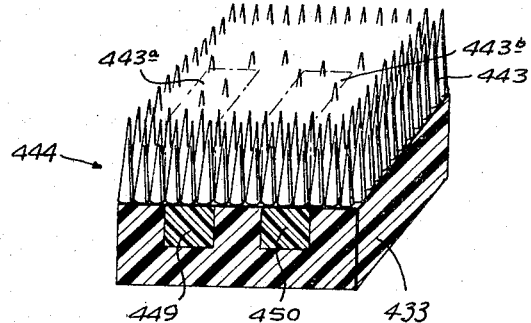
FIG. 13 is a fragmentary axonometric view of the fabric produced by the arrangement illustrated in FIG. 12.

In another modification as shown in FIG. 12, a plurality of discrete portions such as 449 and 450 are placed on the die 432. Over these is placed a sheet 433 of thermoplastic material, preferably of a color different from that of the portions 449 and 450. The process is otherwise as in FIG. 1. During the molding operation, the portions 449 and 450 fuse to the sheet 433 and are forced into the depressions 42 and form a fabric having piliform projections 443, 443a and 443b, as shown by dot-dash lines in FIG. 13. The sections 443a and 443b are preferably of a color different from the projections 443, but they, themselves, may be of like or unlike colors to produce a desired design on the final fabric 444.

Figure 14:
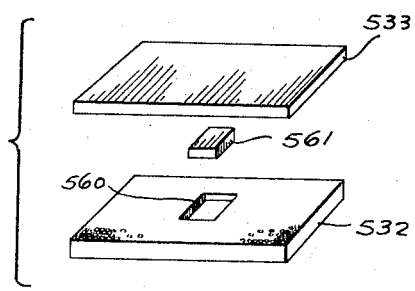
FIG. 14 is a further modification of the arrangement illustrated in FIG. 1.
Figure 15:
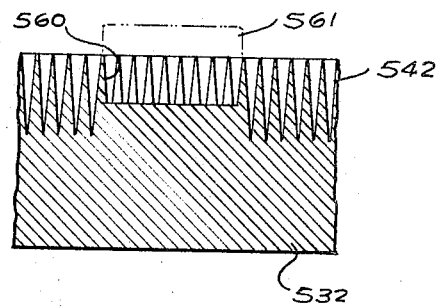
FIG. 15 is a fragmentary vertical section through the matrix of FIG. 14.
Figure 16:
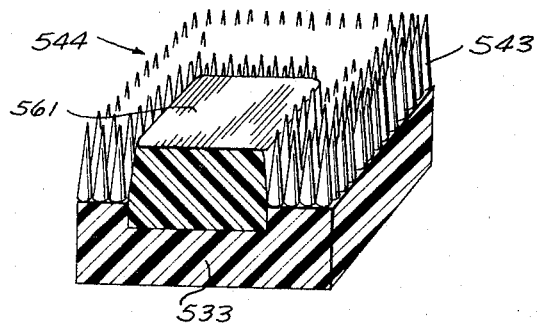
FIG. 16 is a fragmentary axonometric view of the fabric produced by the arrangement of FIGS. 14 and 15.

In FIGS. 14, 15 and 16, I disclose another modification of my method and product. Here the matrix 532 is provided with one or more wells or depressions 560, shown here as rectangular, but which may be of any suitable outline. An ornamental piece 561, having an outline similar to that of the depression 560 is placed in said depression. A sheet of thermoplastic material 533 is placed thereover, and the whole is assembled with suitable accessory parts and subjected to heat and pressure as in FIG. 1. The heat softens the sheet 533 and forces a portion thereof into the depressions 542, while at the same time fusing adjacent parts of the sheet 533 to the ornament 561, producing the piliform fabric 544 having piliform projections 543 with pieces 561 at predetermined locations on the surface thereof.

In the foregoing description, in connection with several modifications, it was noted that in FIG. 10, the opening 380 is rectangular, and that the discrete portions 449 and 450 in FIG. 12 are rectangular. Also in FIG. 14, that the well 561 is rectangular. In connection with FIG. 8 it was noted that the portions 245, 246, 247 and 248 are preferably rectangular. It is to be now understood that any of the portions, thus referred to in this paragraph, may have any suitable outline, either that of a regular geometric figure or that of any other desired figure, without departing from the spirit of my invention.

While this invention has been described in several embodiments, it is to be understood that all modifications are included which are within the scope of the appended claims.

I claim:

1. In the production of a fabric having unitary piliform projections on at least one surface thereof, the steps of
    (a) providing a matrix having a high multiplicity of conical depressions therein,
    (b) placing at least one sheet of thermoplastic material on said matrix,
    (c) applying heat and pressure to said sheet on said matrix sufficient to soften and force a portion of one surface of said sheet into said conical depressions,
    (d) removing said heat and pressure and cooling said sheet and said matrix under increased pressure to prevent stripping of the portions of said sheet in the conical depressions from said sheet,
    (e) removing said cooling and pressure and stripping said fabric from said matrix.

2. The method as defined in claim 1, wherein the first sheet of thermoplastic material and an additional sheet of different thickness are placed one above the other on the matrix.

3. The method as defined in claim 2 in which the sheet of thermoplastic material placed next to the matrix is of a thickness such that all of it flows into the depressions.

4. The method as defined in claim 1 comprising production of areas having different characteristics by uniting portions of thermoplastic material with the surface of the sheet on which the piliform projections are produced.

5. The method as defined in claim 4 wherein the areas of different characteristics are formed by inlaying discrete portions of thermoplastic material on a thermoplastic sheet during formation of the piliform projections.

6. The method as defined in claim 1, including the step of applying a relatively unyielding back-up sheet during the molding operation.

7. The method as defined in claim 1 including the step of applying non-piliform elements to predetermined areas to produce ornamentation.

8. The method as defined in claim 1, wherein the increased pressure is in the range of 5 to 20% greater than that used for molding.

9. In the production of a thermoplastic fabric having integral piliform projections on one surface thereof, the steps of
    (a) providing a planar matrix having a high multiplicity of conical depressions in at least the major portion of the face thereof,
    (b) assembling a plurality of juxtaposed substantially planar thermoplastic elements on said matrix,
    (c) applying heat and pressure on said assembled elements to soften portions of said elements and to force softened material into said depressions,
    (d) removing heat and pressure and cooling said assembly under increased pressure to prevent stripping of the portions of said elements in said depressions,
    (e) removing said cooling and pressure and stripping said sheet from the matrix.

10. The method according to claim 9, wherein the planar elements are contiguous.

11. The method according to claim 9, wherein the planar elements are lamellar.

12. The method according to claim 11, wherein one lamella has at least one opening therein.

13. The method according to claim 9, wherein the heating bonds all elements into a unitary fabric.

References Cited by the Examiner

UNITED STATES PATENTS

| | | | |
|---|---|---|---|
| 2,536,316 | 1/1951 | Schwarz et al. | 264—293 XR |
| 2,619,753 | 12/1952 | Lurie | 264—132 |
| 2,971,245 | 2/1961 | Feild et al. | 161—62 |
| 2,996,764 | 8/1961 | Ross et al. | 264—241 |
| 3,027,595 | 4/1962 | Takai et al. | 18—10 XR |
| 3,121,133 | 2/1964 | Matheus | 264—241 |
| 3,152,002 | 10/1964 | Wisotsky et al. | 264—243 XR |
| 3,179,550 | 3/1965 | Friedman | 161—62 |
| 3,235,438 | 2/1966 | Wisotsky | 264—243 XR |

ROBERT F. WHITE, *Primary Examiner.*

ALEXANDER WYMAN, *Examiner.*

R. H. CRISS, T. J. CARVIS, *Assistant Examiners.*